(12) United States Patent
Balch et al.

(10) Patent No.: US 6,188,310 B1
(45) Date of Patent: *Feb. 13, 2001

(54) NATURAL FREQUENCY MEASUREMENT OF MAGNETIC MARKERS

(75) Inventors: Brent F. Balch, Fort Lauderdale; John A. Allen, Pompano Beach, both of FL (US)

(73) Assignee: Sensormatic Electronics Corporation, Boca Raton, FL (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/980,469

(22) Filed: Nov. 28, 1997

(51) Int. Cl.$^7$ ...................................... H04Q 5/22
(52) U.S. Cl. ......................... 340/10.1; 340/10.3
(58) Field of Search ................ 340/825.54, 825.31, 340/825.32, 825.34, 825.72, 825.14, 825.2, 572, 557, 556, 572.1, 572.4, 572.2, 10.1, 10.3; 342/42, 44, 51; 324/175

(56) References Cited

U.S. PATENT DOCUMENTS

| | | | |
|---|---|---|---|
| 4,031,466 | * 6/1977 | Krause et al. | 324/175 |
| 4,527,152 | 7/1985 | Scarr et al. | 340/572 |
| 4,644,286 | 2/1987 | Torre | 329/50 |
| 4,658,241 | 4/1987 | Torre | 340/551 |
| 4,675,658 | 6/1987 | Anderson et al. | 340/551 |
| 4,963,880 | 10/1990 | Torre et al. | 343/866 |
| 5,023,600 | 6/1991 | Szklany et al. | 340/572 |
| 5,049,857 | 9/1991 | Plonsky et al. | 340/551 |
| 5,353,011 | 10/1994 | Wheeler et al. | 340/572 |
| 5,387,900 | * 2/1995 | Plonsky et al. | 340/572 |
| 5,495,229 | 2/1996 | Balch et al. | 340/551 |
| 5,640,693 | 6/1997 | Balch et al. | 455/127 |
| 5,731,870 | * 3/1998 | Bartko et al. | 348/136 |

\* cited by examiner

*Primary Examiner*—Michael Horabik
*Assistant Examiner*—Prenell Jones
(74) *Attorney, Agent, or Firm*—Quarles & Brady LLP

(57) ABSTRACT

An electronic article surveillance (EAS) system, comprising: an antenna for capturing signals generated in an interrogation zone, the captured signals including noise and, when at least one marker is present in the interrogation zone, a ring down signal with a characteristic frequency generated responsive to a magnetic field transmitted into the interrogation zone; a receiver having a signal processor for extracting amplitude and frequency information from the captured signals; and, a detector responsive to both the amplitude and frequency information for validating when the at least one marker is in the interrogation zone. The signal processor determines an average frequency of all markers in the interrogation zone, the detector being responsive to the average frequency. The signal processor can further determine successive frequency deviations of sequential frequency measurements and magnitudes of the deviations, the detector being responsive to the magnitudes of the deviations.

9 Claims, 1 Drawing Sheet

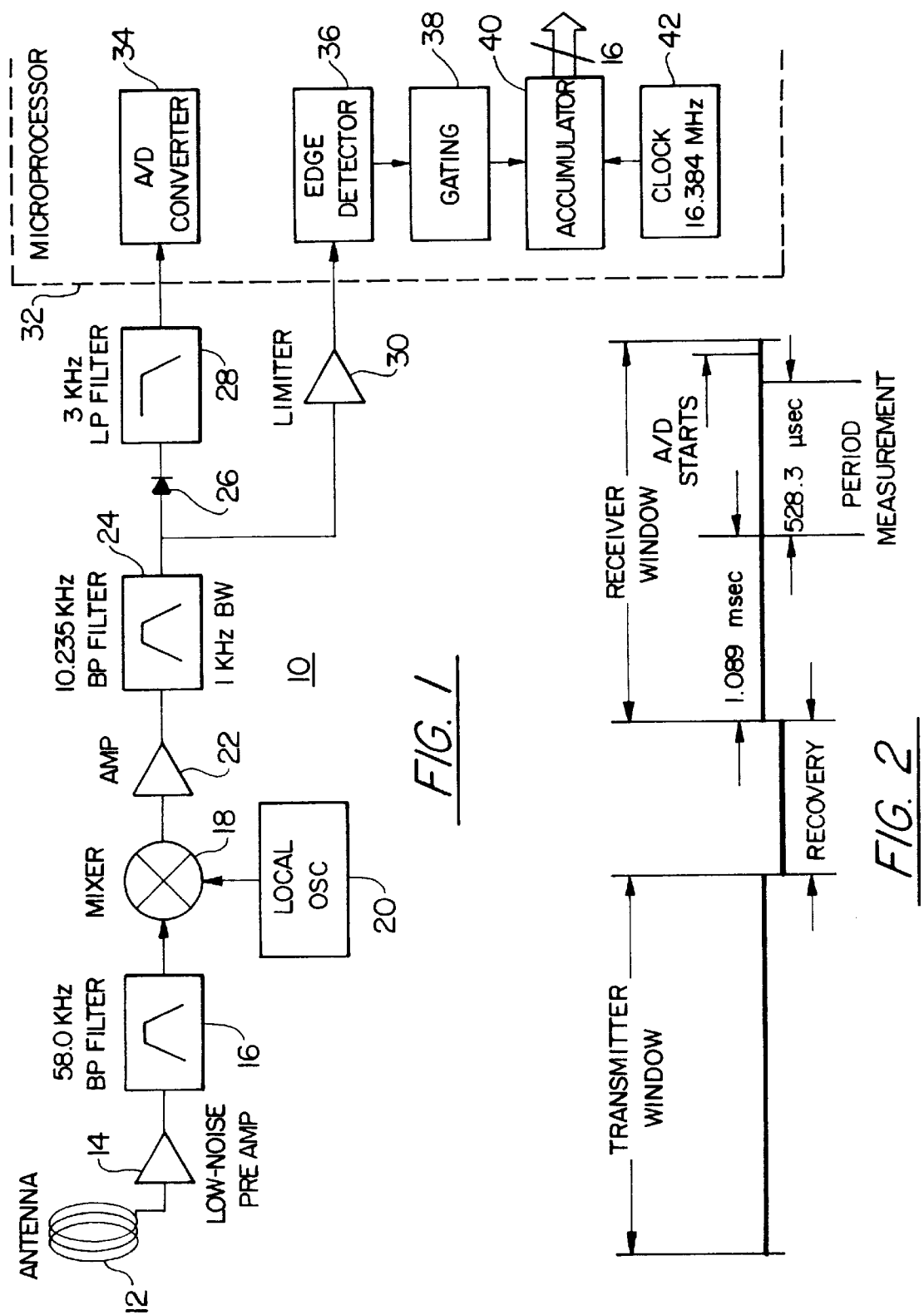

NATURAL FREQUENCY MEASUREMENT OF MAGNETIC MARKERS

BACKGROUND OF THE INVENTION

1. Field of the Invention

This invention relates to the field of pulsed magnetic electronic article surveillance (EAS) systems, and in particular, to EAS systems in which the natural frequency of magnetic markers within the EAS system's interrogation zone can be measured for enhanced discrimination against both noise and the presence of magnetically deactivated markers.

2. Description of Related Art

The reliability of an EAS system is only as good as the system's ability to discriminate against false alarms. The potential for false alarms comes from three sources. A first source of false alarms is electromagnetic noise, both internal circuit noise and external noise from active electronic sources. A second source of false alarms is metallic objects which produce magnetic signals when stimulated by the system's transmitter field, but which do not have a valid magnetic marker affixed to them. A third source of false alarms is partially deactivated or damaged magnetic markers or labels within the system's interrogation zone. Such partially deactivated or damaged markers are also referred to as wounded markers.

Conventional amplitude modulation (AM) receivers can only determine the amount of energy within the receiver's bandwidth due to sources within the receiver's field at any point in time. Making an alarm decision based on amplitude criteria alone leaves opportunities for any of the above three sources of false alarms to cause an erroneous system output.

Since EAS systems are invariably expected to operate at maximum sensitivity, the receivers are constantly processing information at poor or marginal signal-to-noise ratios. This is where the chance of making an erroneous decision is greatest. For this reason, the detection process is extended for a longer time interval in these cases, before making a decision. In high noise situations, the extra time required sometimes means a magnetic marker is not within the interrogation zone long enough and the system fails to alarm.

In the case of systems like the Ultra*Max technology systems of Sensormatic Corporation, the response of the magnetic markers or labels is unique enough to consider the second source of false alarms, namely metallic objects which produce magnetic signals when stimulated by the system's transmitter, to be virtually nonexistent. Ultra*Max is a trademark of Sensormatic Corporation.

The Ultra*Max systems are based on a proprietary magneto-acoustic technology. The system's transmitter develops a pulsed magnetic field from its antenna which imparts energy to a unique magnetic marker or label. When the transmission stops, the marker continues to "ring down" for a time based on its unique physical and magnetic properties, in a manner analogous to a struck tuning fork. After the transmission burst, the Ultra*Max receiver scans the interrogation zone to detect the decaying magnetic pulse from an active label.

Deactivating a label or marker involves the demagnetization of a strip of high coercivity bias material within the label. This has the effect of reducing the amplitude of the label's response, as well as shifting the natural resonant frequency of the label upward. Since valid labels are manufactured to have a natural frequency distribution centered at the receiver's operating frequency, typically 58.0 KHz, reducing the label's amplitude and shifting the response frequency out of the receiver's bandwidth has the desired effect of dropping the deactivated label's signal down into the system background noise.

As part of the normal validation sequence, some system designs shift the receiver operating frequency momentarily into a range typical of deactivated labels. At this time the detected amplitude is compared to the amplitude from the previous, standard operating frequency. If the detected amplitude at this deactivated frequency is greater than that detected at the standard operating frequency, the signal is presumed to derive from a deactivated label and no alarm is produced.

SUMMARY OF THE INVENTION

The inventive arrangements taught herein represent an improvement over previous designs in that an EAS system can determine the actual ring down frequency of a magnetic marker within the system's interrogation field. The ability of an EAS system to measure the frequency characteristics of detected signals provides a significant advantage over previous designs. This ability provides enhanced immunity to false alarms both due to improperly deactivated magnetic markers and due to electrical noise sources.

An electronic article surveillance system in accordance with the inventive arrangements comprises: an antenna for capturing signals generated in an interrogation zone of the EAS system during successive receive windows of a transmit and receive sequence, the captured signals from the interrogation zone including noise and, when at least one of a plurality of markers is present in the interrogation zone, a ring down signal with a characteristic frequency generated by the at least one marker responsive to a magnetic field transmitted into the interrogation zone; a receiver coupled to the antenna having a first signal processor for extracting amplitude information and frequency information from the captured signals; and, a detector responsive to both the amplitude information and the frequency information for validating when the at least one marker is in the interrogation zone.

The signal processor advantageously determines an average frequency of all markers in the interrogation zone, the detector being responsive to the average frequency The system signal processor can further determine, advantageously, successive frequency deviations of sequential frequency measurements and magnitudes of the deviations, the detector being responsive to the magnitudes of the deviations, thereby discriminating between the noise and the markers.

The system receiver can comprise: a local oscillator having a first output signal at a first frequency; a first filter for bandpass filtering the signals captured by the antenna, the first filter having a bandpass characteristic centered at the first frequency; a mixer responsive to the local oscillator output signal and to the bandpass filtered signals; an amplifier for generating a second output signal at an intermediate frequency which may be greater than or less than the first frequency, and responsive to the mixer; a second filter for bandpass filtering the second output signal, the second filter having a bandpass characteristic centered at the intermediate frequency; an amplitude modulation detector responsive to the second output signal, generating a DC voltage proportional to in band energy present in the captured and processed signals during each of the receive windows; an analog to digital converter for the DC voltage; a limiter for amplifying the second output signal and converting the amplified second output signal to a square wave having a constant amplitude and edges which vary with the second output signal; and, a second signal processor for determining zero edge crossings of the square wave.

The second signal processor can comprise a microprocessor, the microprocessor comprising: the analog to digital converter; an edge detector responsive to the square wave; a gating circuit responsive to the edge detector; a source of a clock signal; and, an accumulator responsive to the clock signal and to the gating circuit.

The detector initiates frequency sampling sequences of not less than nine half periods of the intermediate frequency.

BRIEF DESCRIPTION OF THE DRAWINGS

FIG. 1 is a block diagram of a receiver for measuring the frequency of an EAS marker response, in accordance with the inventive arrangements.

FIG. 2 is a timing diagram useful for explaining certain operating characteristics of the receiver shown in FIG. 1.

DETAILED DESCRIPTION OF THE DRAWINGS

With reference to FIG. 1, a receiver 10 chosen is of a superheterodyne design, with a nominal operating frequency of 58.0 KHz and a 1 KHz bandwidth. Signals from the interrogation zone are captured by an antenna 12 and amplified by a low-noise amplifier 14. The receiver 10 uses a local oscillator 20 having a frequency of 68.235 KHz and an intermediate frequency (IF) section centered at 10.235 kHz. The amplified received signals are processed by a bandpass filter 16 centered at the nominal operating frequency of 58.0 KHz. The output of the band pass filter 16 and the output of the local oscillator 20 are inputs to a mixer 18. The output of mixer 18 is an input to the IF amplifier 22.

The output of the IF amplifier 22 supplies an AM detector represented by rectifier 26, which produces a DC voltage envelope proportional to the in-band energy present during the receiver time window. The AC components of this envelope are removed by the pow pass filter 28. The remaining DC voltage is converted to digital form for processing by supplying it to an analog to digital (A/D) converter 34 in the system's microprocessor 32. A suitable microprocessor is the Motorola MC68HC16.

The output of the IF stage is also supplied to a limiter circuit 30, which amplifies the low level IF signal and converts the low level signal to a 5 volt peak square wave. In this way, the output of the limiter is independent of signal amplitude and only the square wave edges vary with the input signal. This variable-period square wave is coupled to an edge detector 36, also in the system's microprocessor 32. The edge detector 36 controls a gating circuit 38, also within the microprocessor 32. The microprocessor has a clock circuit 42 that continuously increments a 16-bit accumulator, or counter, 40 within the microprocessor. The gating circuit 38 determines when the accumulator contents are examined. In this way, the time duration, measured in microprocessor clock cycles, of each half period of the IF output is measured and stored temporarily. The zero crossing edges from the output of the limiter 30 are asynchronous with respect to system timing. Accordingly, enough time has to be allowed to measure nine half periods of the IF waveform, in order to guarantee capturing at least four full cycles of the IF frequency. Combining two sequential half periods enables the full period, and hence the frequency of the IF output to be calculated.

Amplitude modulated noise at the IF output can cause zero crossing errors, resulting in period measurement errors. Amplitude modulated noise can be considered the equivalent of phase noise in the frequency measurement circuit. Instantaneous measurements, that is single period measurements, can have significant errors due to this phase noise. For this reason, four period measurements are taken in each receive window and, since a minimum of four receive windows of information are required for the software to complete a successful validation sequence, a minimum of sixteen periods of the IF output frequency are available for statistical analysis.

Signals at the output of the IF amplifier represent the difference between the incoming frequency and the local oscillator frequency. Thus, if a 58.0 KHz signal is received, the IF output will be:

$$68.235 \text{ KHz} - 58.0 \text{ KHz} = 10.235 \text{ KHz.}$$

The IF output will also be 10.235 KHz if the received signal is 78.47 KHz:

$$78.47 \text{ KHz} - 68.235 \text{ KHz} = 10.235 \text{ KHz.}$$

In this case, 78.47 KHz is considered an image or undesired detector output. In order to prevent such image responses, superheterodyne receivers usually provide significant bandpass filtering before the mixer to reduce any input signals near the image frequency.

The frequency of the receiver input can be inferred by measuring the period, and hence the frequency, of the IF output, because the image frequency, equal to the sum of the frequency of the local oscillator and 10.235 KHz, is heavily suppressed by the preceding bandpass filter stages.

As shown in the timing diagram of FIG. 2, following the system's transmitter burst, and after a predefined recovery interval to let any residual transmitter current in the antennas decay to zero, the receiver is gated on for 1.7 msec. If an active marker is present within the system's interrogation zone, its ring down signal will be detected by the receiver during this receiver window. Experiments have shown that, with the IF bandpass filter's characteristics as explained in connection with FIG. 1, about 1 msec is required for this bandpass filter to stabilize and provide reliable readings. Accordingly, the half period measurements do not start until 1.089 msec after the start of the receive interval. The period measurements continue for 528.3 $\mu$sec, at which time the process is discontinued to allow enough time to service the A/D converter 34 to get the amplitude measurement for the current window, which is a higher priority measurement.

If the receiver processes an input signal at exactly 58.0 KHz, the IF output will have a frequency of exactly:

$$68.235 \text{ KHz} - 58.0 \text{ KHz} = 10.235 \text{ KHz.}$$

The period corresponding to a frequency of 10.235 KHz is 97.7 $\mu$sec.

The receiver uses high-side injection, that is, the 68.235 KHz local oscillator frequency is above the receiver's center frequency, and accordingly, input frequencies above 58.0 KHz result in an IF output frequency lower than 10.235 KHz. The period of the IF output signal is thus longer. The highest input frequency, guaranteed to provide at least 9 half periods is:

$$68,235 - \frac{1}{2 \times \left(\frac{528.3 \times 10^{-6}}{9}\right)} = 59,717.112 \text{ Hz}$$

The method, as described, is guaranteed to capture at least four full periods of IF response from any marker whose frequency is 59.717 KHz or less. Of course, depending on exactly when the IF signal period starts with respect to the measurement interval, four periods of signals as high as 60.663 KHz can be captured, but with decreasing reliability.

Within each receiver window, four complete cycles of the IF are captured. If the receiver is in a validation sequence, that is processing possible marker information as opposed to background noise, then the frequency information is stored temporarily in memory. Within a validation sequence, this capture-and-store process is repeated a programmable number of times, typically four times. Before a final decision is made to generate an alarm, these stored frequency samples, typically 16, are averaged to reduce errors in measurement due to noise and compared against a programmed limit frequency, to determine if the detected signal might be from an improperly deactivated or wounded marker.

A further advantage of the inventive arrangements for discriminating against improperly deactivated markers is the insensitivity to signal amplitude. If a marker is located very close to a system's antenna, the signal levels are so high that signal clipping and distortion commonly occur. This causes amplitude based schemes to produce erroneous results. Frequency measurement provides consistent information over a much broader range of marker amplitudes than amplitude based techniques. In addition to using the inventive arrangements for the purpose of discriminating against improperly deactivated markers, the same processed data provides information regarding the frequency of valid markers within the system's interrogation zone. The bandpass characteristics of the described EAS receiver shape the more random environmental and circuit noise at the receiver's detector into a Gaussian distribution. This means that, when only background noise is present, the average frequency measured by the above technique will be centered at the receiver's operating frequency. However, the individual period measurements will have a higher variability. As a result, when only noise is present, the standard deviation of the 16 samples will be much higher than when a marker is within the interrogation zone. Since computation of the standard deviation can be a mathematical burden on the processor in the described system, the minimum and maximum frequencies of the data set are determined and the frequency difference is computed. Since the response of a magnetic marker is non-Gaussian, its frequency difference is always smaller that of background noise. This characteristic allows discrimination against potential false alarms due to noise phenomena.

In summary, confirmation that a detected marker's frequency is within prescribed limits serves to increase the validity of an alarm decision. If the average frequency is within acceptable limits but the frequency deviations are too large, the interpretation is that the signals are due to noise and no alarm is given. If the frequency deviations are small, but the average frequency is above a defined limit, the interpretation is that the signals come from an improperly deactivated marker and no alarm is given.

What is claimed is:

1. An electronic article surveillance (EAS) system, comprising:

an antenna for capturing signals generated in an interrogation zone of said EAS system during successive receive windows of a transmit and receive sequence, said captured signals from said interrogation zone including noise and, when at least one of a plurality of markers is present in said interrogation zone, a ring down signal with a characteristic frequency generated by said at least one marker responsive to a magnetic field transmitted into said interrogation zone;

a receiver coupled to said antenna having a first signal processor for extracting amplitude information and frequency information from said captured signals, said frequency information including a measured time duration of a portion of an IF waveform signal produced as a result of said ring down signal, said measured time duration proportional to said characteristic frequency; and, a detector responsive to both said amplitude information and said frequency information for validating when said at least one marker is in said interrogation zone.

2. The system of claim 1, wherein said signal processor determines an average frequency of each of said markers in said interrogation zone, said detector being responsive to said average frequency.

3. The system of claim 2, wherein said signal processor determines successive frequency deviations of sequential frequency measurements and magnitudes of said deviations, said detector being responsive to said magnitudes of said deviations, thereby discriminating between said noise and said markers.

4. The system of claim 1, wherein said receiver comprises:

a local oscillator having a first output signal at a first frequency;

a first filter for bandpass filtering said signals captured by said antenna, said first filter having a bandpass characteristic centered at said first frequency;

a mixer responsive to said local oscillator output signal and to said bandpass filtered signals;

an amplifier for generating a second output signal at an intermediate frequency different than said first frequency, and responsive to said mixer;

a second filter for bandpass filtering said second output signal, said second filter having a bandpass characteristic centered at said intermediate frequency;

an amplitude modulation detector responsive to said second output signal, generating a DC voltage proportional to in band energy present in said captured and processed signals during each of said receive windows;

an analog to digital converter for said DC voltage;

a limiter for amplifying said second output signal and converting said amplified second output signal to a square wave having a constant amplitude and edges which vary with said second output signal; and, a second signal processor for determining zero edge crossings of said square wave.

5. The system of claim 4, wherein said second signal processor comprises a microprocessor, said microprocessor comprising:

said analog to digital converter;

an edge detector responsive to said square wave;

a gating circuit responsive to said edge detector;

a source of a clock signal; and, an accumulator responsive to said clock signal and to said gating circuit.

6. The system of claim 1, wherein said receiver comprises an amplifier for generating an output signal at an intermediate frequency, said detector initiating frequency sampling sequences of not less than six half periods of said intermediate frequency.

7. The system of claim 1, wherein said receiver comprises an amplifier for generating an output signal at an intermediate frequency, said detector initiating frequency sampling sequences of not less than seven half periods of said intermediate frequency.

8. The system of claim 1, wherein said receiver comprises an amplifier for generating an output signal at an intermediate frequency, said detector initiating frequency sampling sequences of not less than eight half periods of said intermediate frequency.

9. The system of claim 1, wherein said receiver comprises an amplifier for generating an output signal at an intermediate frequency, said detector initiating frequency sampling sequences of not less than nine half periods of said intermediate frequency.

* * * * *